United States Patent [19]

Kawasaki et al.

[11] E Re. 28,850

[45] Reissued June 8, 1976

[54] PROCESS FOR PREPARING ALTERNATING COPOLYMER OF BUTADIENE AND α-OLEFINE AND NOVEL ALTERNATING COPOLYMER OF BUTADIENE AND α-OLEFINE CONTAINING CIS-CONFIGURATION BUTADIENE UNIT

[75] Inventors: Akihiro Kawasaki; Isao Maruyama, both of Ichihara, Japan

[73] Assignee: Maruzen Petrochemical Co., Ltd., Tokyo, Japan

[22] Filed: July 9, 1975

[21] Appl. No.: 594,512

Related U.S. Patent Documents

Reissue of:

[64] Patent No.: 3,766,153
Issued: Oct. 16, 1973
Appl. No.: 278,416
Filed: Aug. 7, 1972

U.S. Applications:

[62] Division of Ser. No. 35,637, May 8, 1970, Pat. No. 3,714,133.

[30] Foreign Application Priority Data

| | | |
|---|---|---|
| May 13, 1969 | Japan | 44-36161 |
| July 16, 1969 | Japan | 44-55768 |
| July 24, 1969 | Japan | 44-58030 |
| Aug. 7, 1969 | Japan | 44-62009 |
| Dec. 12, 1969 | Japan | 44-99375 |
| Dec. 12, 1969 | Japan | 44-99376 |

[52] U.S. Cl. ..... 526/98; 260/32.8 A; 260/33.2 R; 260/79.5 B; 260/79.5 C; 260/83.7; 260/85.3 R; 260/85.3 C; 260/88.2 E; 526/107; 526/339; 526/340

[51] Int. Cl.[2] ..... C08F 4/52; C08F 210/00; C08F 212/08; C08F 236/06

[58] Field of Search ..... 260/84.1, 85.3 R

[56] References Cited

UNITED STATES PATENTS

| | | | |
|---|---|---|---|
| 3,210,332 | 10/1965 | Lyons et al. | 260/93.7 |
| 3,317,496 | 5/1967 | Natta et al. | 260/88.2 |
| 3,462,406 | 8/1969 | Natta et al. | 260/94.3 |
| 3,466,268 | 9/1969 | Burton et al. | 260/85.3 R |
| 3,470,144 | 9/1969 | Minekawa et al. | 260/85.3 |
| 3,506,632 | 4/1970 | Henderson | 260/85.3 |
| 3,652,518 | 3/1972 | Kawasaki et al. | 260/85.3 R |
| 3,652,519 | 3/1972 | Kawasaki et al. | 260/85.3 R |
| 3,700,638 | 10/1972 | Kawasaki et al. | 260/85.3 R |
| 3,714,133 | 1/1973 | Kawasaki et al. | 260/84.1 |
| 3,803,106 | 4/1974 | Hayashi et al. | 260/85.3 R |

*Primary Examiner*—Alan Holler
*Attorney, Agent, or Firm*—Flynn & Frishauf

[57] ABSTRACT

A process for preparing alternating copolymer of butadiene and α-olefine which comprises contacting butadiene and the α-olefine in liquid phase with a catalyst system comprising the first component of $AlR_3$ wherein R represents a hydrocarbon radical selected from the group consisting of alkyl, aryl and cycloalkyl radical in which at least one R is selected from the group consisting of alkyl having at least 3 carbon atoms per one molecule, aryl and cycloalkyl radical and the second component of $TiX'_4$ wherein X' is selected from the group consisting of chlorine, bromine and iodine, or a catalyst system comprising the first component of $AlR_3$ wherein R represents a hydrocarbon radical selected from the group consisting of alkyl, aryl and cycloalkyl radical, and the second component of $TiX'_4$ wherein X' is the same as that defined above and the third component of a carbonyl group-containing compound. An alternating copolymer of butadiene and α-olefine, the microstructure of butadiene unit of the alternating copolymer contains cis-configuration. The alternating copolymers are rubber-like in character and can be used as polymeric plasticizers, in adhesives and can be vulcanized with sulfur or a sulfur compound to produce vulcanized elastomers.

9 Claims, 10 Drawing Figures

PROCESS FOR PREPARING ALTERNATING COPOLYMER OF BUTADIENE AND α-OLEFINE AND NOVEL ALTERNATING COPOLYMER OF BUTADIENE AND α-OLEFINE CONTAINING CIS-CONFIGURATION BUTADIENE UNIT

Matter enclosed in heavy brackets [ ] appears in the original patent but forms no part of this reissue specification; matter printed in italics indicates the additions made by reissue.

RELATED APPLICATIONS

This application is related to application Ser. Nos. 884,479 and 884,871, filed Dec. 12 and 15, 1969, respectively, and now U.S. Pat. Nos. 3,652,519 and 3,652,518, each of Mar. 28, 1972.

This is a division of application Ser. No. 35,637, filed May 8, 1970, now U.S. Pat. No. 3,714,133.

BACKGROUND OF THE INVENTION

(1) Field of the Invention

The present invention relates to a process for preparing an alternating copolymer of butadiene and α-olefine and a novel alternating copolymer obtained thereby. The novel alternating copolymer of this invention contains considerable amounts of cis-configuration butadiene unit.

(2) Description of the Prior Art

Because of its chipping and cutting properites and its low skid resistance, the demand for cis-1.4 polybutadiene in the field of automobile tires is not so large as was expected at first. The defects have been ascribed to its unbranched straight-chain structure. In order to overcome these defects, many attempts have been made to produce alternating copolymers of butadiene and α-olefine, for example, butadiene and propylene, butadiene and 1-butene, etc. However, in general, it is not easy to produce even a random copolymer of butadiene and α-olefine by an ionic catalyst.

For instance, German Pat. 1,173,254 claims a process for preparing a copolymer of conjugated diene and mono-olefine using vanadium (V) oxychloride as the catalyst, but the examples do not show a copolymerization reaction of butadiene and propylene. German Pat. 1,144,924 claims a process for preparing a copolymer of diene and ethylene or propylene by using a catalyst system consisting of a compound of Ti, Zr, Ce, V, Nb, Ta, Cr, Mo or W in which the metal is at least in part below a valency of 3. This patent shows the copolymerization reaction of butadiene and ethylene by titanium tetrachloride-lithium-aluminum hydride, titanium, tetrachloride-phenylmagnesium bromide, titanium tetrachloride-sodium dispersion, zirconium, tetrachloride-tintetrabutyl and tetraoctyltitanate-phenylmagnesium bromide catalyst systems in its examples, but a process for preparing a copolymer of butadiene and propylene is not shown. Belgian Pat. 625,657 also describes a process for preparing co- and terpolymers of butadiene with ethylene and (or) α-olefines by using a catalyst system containing a hydrocarbon-soluble vanadium compound and an organoaluminum compound containing more than one organic group having strong sterical hindrance, e.g. 3-methyl-butyl, cycloalkyl or cyclopentyl methyl, and it claims a process for preparing ethylene-propylene-butadiene terpolymer. However, no example of butadiene-propylene copolymer is shown in it.

On the other hand, British Pat. 1,108,630 shows a process for preparing a rubbery random copolymer of butadiene and propylene of high molecular weight with high content of propylene by using a three components catalyst system consisting of trialkylaluminum, iodine and a compound having the general formula of $TiBr_nCl_{4-n}$ wherein n is zero or an integer of 1 to 4. The microstructure of butadiene unit and the content of propylene unit in the copolymer are shown in the patent. But there are shown no experimental results which support the assumption which the copolymer should be a random copolymer of butadiene and propylene. A random copolymer of butadiene and propylene was also prepared by using a catalyst system consisting of triethylaluminum, titanium tetrachloride and polypropylene oxide. Polypropylene oxide was used as a randomizer and therefore a copolymer of butadiene and propylene prepared by the catalyst system of triethylaluminum and titanium tetrachloride was shown to be blocktype. The molar ratio of triethylaluminum to titanium tetrachloride was 1.08 (Al/Ti=1.08) (paper presented at 2nd Symposium on Polymer Synthesis, Tokyo, Oct. 5, 1968, the Society of Polymer Science, Japan). British Pat. 1,026,615 claims a process for preparing a random copolymer of butadiene and propylene by forming a catalyst system of triethylaluminum and titanium tetrachloride in the presence of propylene, and then adding butadiene to the catalyst system. According to the patent, the propylene content of the copolymer was much higher than that of the copolymer prepared by the catalyst formed after the monomers were mixed. This result is inconsistent with the result described in the above paper. A copolymerization reaction of butadiene and propylene was also carried out by using a catalyst system of triethylaluminum and titanium tetrachloride prepared in propylene and the product was confirmed, by fractional precipitation test, to be a copolymer of butadiene and propylene (Chemistry of High Polymers, The Society of Polymer Science, Japan, 20, 461 (1963)). The molar ratio of triethylaluminum to titanium tetrachloride of the above catalyst system was 1.5 (Al/Ti=1.5). The content of this paper corresponds to that of the above British patent, but there is no description in it showing that the copolymer should be a random copolymer of butadiene and propylene.

According to the methods of British Patent 982,708, a mixture containing 80–95 mole percent butadiene, the rest being 4-methyl-1-pentene, is polymerized at a temperature in the range 0° to 30° C. by a catalyst system which is the reaction product of vanadium (V) oxychloride with triisobutylaluminum, an aluminum-dialkyl monochloride or an aluminum sesquialkyl chloride. The microstructure of the copolymer is not shown in the patent. British Patent 924,654 describes a process for preparing a copolymer of butadiene and propylene by using an "Alfin" catalyst. The copolymer showed a characteristic infra-red absorption band at 11.95 microns. It was ascribed to trisubstituted ethylene structure. Therefore, the result does not support the assumption that the copolymer should be a random or alternating copolymer of butadiene and propylene.

Recently, Furukawa et al. also reported the process of preparing alternating copolymers of butadiene and α-olefine by using vanadyl (V) chloride-diethylaluminum monochloride-triethylaluminum catalyst system (22nd Annual Meeting of Japan Chemical Society, Tokyo, Mar. 31, 1969). However, the molecular weight of the copolymer was very low and its intrinsic viscosity did not exceed 0.1 dl./g.

Consequently, as far as the inventors know, with the exception of the methods of Furukawa et al. described above, there is no prior art in connection with alternating copolymers of butadiene and $\alpha$-olefine nor of a process for their preparation.

SUMMARY OF THE INVENTION

The object of the present invention is to provide new catalytic systems giving high molecular weight alternating copolymer of butadiene and $\alpha$-olefine in high yield.

In accordance with this invention, we have found that by using the catalyst system composed of the first component of an organoaluminum compound having the general formula of $AlR_3$ where R represents a hydrocarbon radical selected from the group consisting of alkyl, aryl and cycloalkyl radicals and at least one R is selected from the group consisting of an alkyl radical having at least 3 carbon atoms, aryl radical and cycloalkyl radical and the second component of titanium tetrahalide having the general formula of $TiX'_4$ (wherein X' represents chlorine, bromine or iodine, hereinafter the same) or by using the catalyst system composed of the first component of $AlR_3$ wherein R represents a hydrocarbon radical selected from the group consisting of alkyl, aryl and cycloalkyl radicals, the second component of $TiX'_4$ (wherein X' is the same as that defined above) and the third component of a carbonyl group-containing compound, high molecular weight alternating copolymers of butadiene and $\alpha$-olefine can be produced in high yield. We have also found that by adding halogen (fluorine inclusive), halogen (fluorine inclusive) containing compound, metal oxide or metalloid oxide to the above mentioned catalyst systems, the catalytic properties of the above mentioned catalysts can be further improved.

The alternating copolymers of this invention are rubber-like in character and can be used as polymeric plasticizers, in adhesives and can be vulcanized with sulfur or a sulfur compound to produce vulcanized elastomers.

The microstructure of butadiene unit of the alternating copolymer of butadiene and $\alpha$-olefine prepared by the methods of Furukawa et al. described above was trans 1.4-configuration. The main components forming the catalyst systems were an organoaluminum compound and a vanadium compound. On the other hand the main components forming the catalyst systems of this invention are an organoaluminum compound and a titanium compound and moreover considerable amounts of cis 1.4-configuration and small amounts of 1.2-configuration are found in the butadiene unit of the alternating copolymer. In other words the structure of the alternating copolymer prepared by the catalyst system of an organoaluminum compound and a vanadim compound previously reported is different from that of the alternating copolymer prepared by the catalyst system of an organoaluminum compound and a titanium compound of this invention. Therefore the alternating copolymers of butadiene and $\alpha$-olefine prepared by the process of this invention are new materials.

The carbonyl group containing compound which form the third component of the catalyst systems of this invention are carbon dioxide, aldehyde, keto-aldehyde, ketone, carboxylic acid, keto-carboxylic acid, oxy-carboxylic acid, carboxylic acid halide, keto-carboxylic acid halide, oxy-carboxylic acid halide, carboxylic acid anhydride, keto-carboxylic acid anhydride, oxy-carboxylic acid anhydride, salt of carboxylic acid, salt of keto-carboxylic acid, salt of oxy-carboxylic acid, ester of carboxylic acid, ester of keto-carboxylic acid, ester of oxy-carboxylic acid, carbonyl halide, carbonate, carbonic ester, lactone, ketene, quinone, acyl peroxide, metal complex involving carbonyl group, acid amide, acid imide, isocyanate, aminoacid, urein, ureide, salt of carbamic acid, ester of carbamic acid, ureide acid, etc.

The halogen used as the other third component of the catalyst system of this invention is chlorine, bromine iodine or fluorine. The halogen compounds which form the other third component of the catalyst system of this invention are the compounds having transition metal-X linkage (X is halogen) such as compounds having the general formulae $VX_4$, $VOX_3$, $WX_6$, $MoX_5$, $CrO_2X_2$, $ZrX_4$, $FeX_3$, $OV(OR)_nX_{3-n}$ (R is a hydrocarbon radical such as alkyl radical, aryl radical or cycloalkyl radical, hereinafter the same, and n is a number from 1 to 2), $Zr(OR)_2X_2$, $Ti(OR)_nX_{4-n}$ (n is a number from 1 to 3), $Zr(OR)_3X$, $OV(C_5H_7O_2)_nX_{3-n}$ (n is a number from 1 to 2), $V(C_5H_5)_nX_{4-n}$ (n is a number from 1 to 2, $V(C_5H_5)_2X$, $OV(C_5H_5)X_2$, $Ti(C_5H_5)_2X$, $Ti(C_5H_5)X_3$, $Ti(C_5H_5)_2X_2$, $(C_5H_5)Ti(OR)X_2$, $(C_5H_5)_2CrX$, $(C_5H_5)Mo(CO)_3X$, $(C_5H_5)_2IrX_3$, etc.; and alkane compounds having C–X linkage wherein X is halogen such as tert-butyl chloride, tert-butyl bromide, tert-butyl iodide, sec-butyl chloride, sec-butyl bromide, sec-butyl iodide, carbon tetrachloride, carbon tetrabromide, carbon tetraiodide, etc.; Lewis acid-base complex compounds which formed from halogen compounds showing Lewis acid property such as compounds of the general formulae $H_gX_2$ (wherein X is halogen, hereinafter the same). CuX, $ZnX_2$, $BiX_3$, $FeX_3$, $SnX_4$, $BX_3$, $AlX_3$, $AlR_nX_{3-n}$ (R is a hydrocarbon radical such as alkyl radical, aryl radical or cycloalkyl radical, hereinafter the same, and n is a number from 1 to 2), $VOX_3$, $VX_4$, $CrO_2X_2$, $NiX_2$, $MoX_5$, $ZrX_4$, $PX_5$, $SbX_5$, AlOX, $WX_6$, $MnX_2$, $M_gX_2$, and the like. Lewis base such as ether, pyridine, amine, phosphine, derivatives of these compounds, etc., are also employed. The halogen compounds which form the fourth component of the catalyst system of this invention are the ones showing Lewis acid property such as compounds of the general formulae $VX_4$ (wherein X is halogen, hereinafter the same), $VOX_3$, $WX_6$, $MoX_5$, $CrO_2X_2$, $ZrX_4$, $FeX_3$, $BX_3$, $PX_5$, $SnX_4$, $SbX_5$, AlOX, $AlX_3$, $AlR_nX_{3-n}$ (R is a hydrocarbon radical such as alkyl radical, aryl radical or cycloalkyl radical and n is a number from 1 to 2), $WX_6$, CuX, $MnX_2$, $MgX_2$, $ZnX_2$, $HgX_2$, $BiX_3$, $NiX_2$, etc.; Lewis base complex compounds of the above mentioned halogen compounds showing Lewis acid property such as compounds of the general formulae $AlX_3$-$O(C_2H_5)_2$, $BX_3$-$O(C_2H_5)_2$, $ZnX_2$-Py (wherein Py represents pyridine, hereinafter the same), $VOCl_3$-$O(C_2H_5)_2$, $NiX_2$-Py, $FeX_3$-$O(C_2H_5)_2$, $HgX_2$-Py, etc.; organoaluminum compounds having Al-X linkage such as compounds of $Al(OR)_nX_{3-n}$ (n is a number from 1 to 2), etc., organo-transition metal compounds having transition metal-X linkage such as compounds of the general formulae $OV(OR)_nX_{3-n}$ (n is a number from 1 to 2), $Ti(OR)_nX_{4-n}$ (n is a number from 1 to 3), $Zr(OR)_2X_2$, $Zr(OR)_3X$, $OV(C_5H_7O_2)_nX_{3-n}$ (n is a number from 1 to 2), $V(C_5H_5)_nX_{4-n}$ (n is a number from 1 to 2), $V(C_5H_5)_2X$, $OV(C_5H_5)X_2$, $Ti(C_5H_5)_2X$, $Ti(C_5H_5)X_3$, $Ti(C_5H_5)_2X_2$, $(C_5H_5)Ti(OR)X_2$, $(C_5H_5)_2CrX$, $(C_5H_5)Mo(CO)_3X$, $(C_5H_5)_2IrX_3$, etc.; halogenated alkane compounds such as tert-butyl halide, sec-butyl halide, carbon tetrahalide. The metal oxide or metalloid oxide which forms the other fourth component of the catalyst system of the present invention are magnesium oxide, zinc oxide, aluminum oxide, titanium dioxide, vanadium pentoxide, silicon dioxide, silica-alumina, zeolite, boron trioxide, etc.

In the preferred embodiment, the molar ratio of organoaluminum compound which forms the first component of the catalyst system of the present invention to titanium tetrahalide which forms the second component of the catalyst system should be higher than (1.5 Al/Ti>1.5).

The olefine should be one having the general formula:

$$CH_2{=}CHR'$$

(in this formula, R' may be a normal chain or branched chain lower alkyl group or a phenyl group).

The preparation of the alternating copolymer of butadiene and $\alpha$-olefine is carried out by contacting butadiene with $\alpha$-olefine in liquid phase in the presence of the catalyst system described above. The copolymerization reaction is generally carried out in the presence of a liquid organic diluent. A suitable diluent that can be used for the copolymerization reaction is a hydrocarbon compound, such as heptane, octane, isooctane, benzene or toluene. The temperature of the copolymerization reaction may be varied from −100° C. to 50° C. and sufficient pressure is employed to keep the monomers in liquid phase. The molar ratio of butadiene to $\alpha$-olefine in the initial monomer composition may be from 20:80 to 80:20 and more preferably is 50:50.

At the completion of the copolymerization reaction, the product is precipitated and deashed by using a methanol-hydrochloric acid mixture. The precipitated product is washed with methanol for several times and dried under vacuum. Thereafter the product is extracted with methyl ethyl ketone and diethyl ether successively. The methyl ethyl ketone soluble fraction is a low molecular weight alternating copolymer and methyl ethyl ketone insoluble and diethyl ether soluble fraction is a high molecular weight alternating copolymer.

DESCRIPTION OF THE PREFERRED EMBODIMENTS

Figure 1:
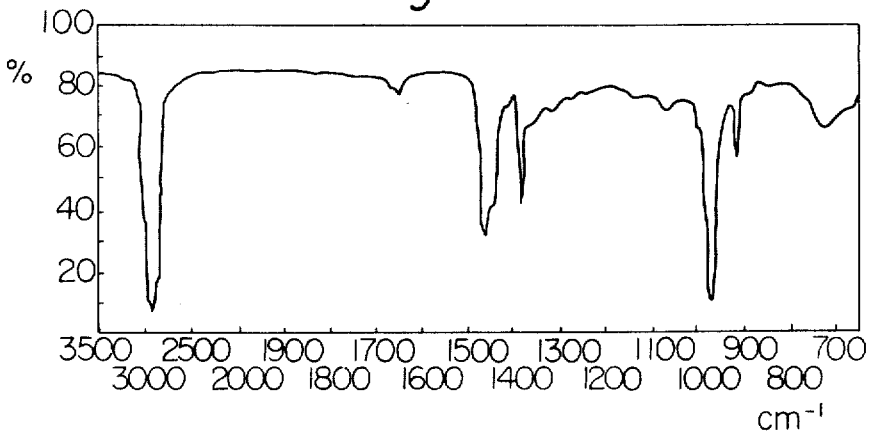
FIG. 1 shows the infra-red spectrum of the methyl ethyl ketone insoluble and diethyl ether soluble alternating copolymer of butadiene and propylene prepared by the process of this invention.

The invention will be illustrated with reference to the following examples.

Example 1

The usual, dry, air-free technique was employed and 6.5 milliliters toluene, 0.50 millimole carbonyl group containing compound and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 1. As can be seen in Table 1, the yield of high molecular weight alternating copolymer increased by using three components catalyst system.

The following results support the conclusion that the copolymer is an alternating copolymer of butadiene and propylene.

(1) The composition of the copolymer according to the NMR analysis substantially agrees with the calculated value for 1:1 copolymer of butadiene and propylene. Copolymer compositions were determined by measuring the ratio of peak area at 4.65$\tau$ of butadiene unit to that of doublet at 9.11$\tau$ and 9.20$\tau$ of propylene unit.

(2) The copolymerization reaction gives 1:1 copolymer over a wide range of initial monomer composition.

(3) The copolymerization reaction gives 1:1 copolymer independently of polymerization time.

(4) The 1155 cm.$^{-1}$ band of propylene homopolymer is not shown in its infra-red spectrum. This means at least that the length of the propylene-propylene repeating unit of the copolymer is not so long as to be detected by its infra-red spectrum.

TABLE 1

| Experiment No. | Catalysts: $Al(i\text{-}Bu)_3$ (mmol) | $TiCl_4$ (mmol) | Carbonyl compound | Mmol | Alternating copolymer: MEK soluble fraction (g.) | MEK insoluble, diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | 2-chloroethyl benzoate | 0.50 | 0.05 | 0.05 | | | |
| 2 | 2.0 | 0.2 | Benzophenone | 0.50 | 0.23 | 0.57 | 57 | 36 | 7 |
| 3 | 2.0 | 0.2 | Isobutylaldehyde | 0.50 | 0.20 | 0.57 | | | |
| 4 | 2.0 | 0.2 | Benzoyl chloride | 0.50 | 0.25 | 0.23 | | | |
| 5 | 2.0 | 0.2 | Isobutyric acid | 0.50 | 0.42 | 1.39 | 69 | 26 | 5 |
| 6 | 2.0 | 0.2 | Benzoic acid | 0.50 | 0.14 | 0.61 | | | |
| 7 | 2.0 | 0.2 | Monochloroacetic acid | 0.50 | 0.17 | 0.29 | | | |
| 8 | 2.0 | 0.2 | Maleic acid anhydride | 0.50 | 0.16 | 0.82 | 70 | 24 | 6 |
| Reference | 2.0 | 0.2 | | | | 0.03 | | | |

Example 2

The usual, dry, air-free technique was employed and 6.5 milliliters toluene, 0.50 millimole carbonyl group containing compound and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −15° C. for 16 hours. The results are summarized in Table 2.

TABLE 2

| Experiment No. | Catalysts: $Al(i\text{-}Bu)_3$ (mmol) | $TiCl_4$ (mmol) | Carbonyl compound | Mmol | Alternating copolymer: MEK soluble fraction (g.) | MEK insoluble diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | Diethyl malonate | 0.50 | 0.35 | 0.12 | 74 | 21 | 5 |
| 2 | 2.0 | 0.2 | Ethyl acetate | 0.50 | 0.30 | 0.56 | 60 | 28 | 12 |
| 3 | 2.0 | 0.2 | Acetone | 0.50 | 0.62 | 0.42 | 65 | 28 | 7 |
| 4 | 2.0 | 0.2 | Benzaldehyde | 0.50 | 0.21 | 0.18 | 57 | 35 | 8 |
| 5 | 2.0 | 0.2 | Acetic acid anhydride | 0.50 | 0.17 | 1.85 | 64 | 30 | 6 |
| Reference | 2.0 | 0.2 | | | | 0.07 | | | |

Example 3

The usual, dry, air-free technique was employed and 6.5 milliliters toluene, varying amounts of carbonyl group containing compound and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triethylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 3.

TABLE 3

| Experiment No. | Catalysts: $AlEt_3$ (mmol) | $TiCl_4$ (mmol) | Carbonyl compound | | Alternating copolymer: MEK soluble fraction (g.) | MEK insoluble, diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | Maleic acid anhydride | 0.05 (g.) | 0.11 | 0.11 | 57 | 30 | 13 |
| 2 | 2.0 | 0.2 | Propionic acid | 0.037 (ml.) | 0.21 | 0.21 | 70 | 25 | 5 |
| Reference | 2.0 | 0.2 | | | 0 | 0 | | | |

Example 4

The usual, dry, air-free technique was employed and 3.5 milliliters toluene, 0.12 milliliter acetic acid anhydride and 0.5 millimole titanium tetrabromide were put in a 25 milliliters glass bottle at 25° C. Then the bottle was left alone at 25° C. for 10 minutes. Thereafter the bottle was held in a low temperature bath at −78° C. and 5.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 14 hours. Yield of the methyl ethyl ketone soluble alternating copolymer of butadiene and propylene was 0.13 g. and that of methyl ethyl ketone insoluble and diethyl ether soluble alternating copolymer of butadiene and propylene was 1.67 g. When the two components catalyst system consisting of 0.5 millimole titanium tetrabromide and 5.0 millimoles triisobutylaluminum was used and the other copolymerization conditions were the same as the example, yield of the methyl ethyl ketone soluble fraction was 0.07 g. and that of methyl ethyl ketone insoluble and diethyl ether soluble fraction was 0.03 g.

Example 5

The usual, dry, air-free technique was employed and 3.5 milliliters toluene, 0.12 milliliter isobutyric acid and 0.5 millimole titanium tetraiodide were put successively in a 25 milliliters glass bottle at 25° C. Then the bottle was left alone at 25° C. for 10 minutes. Thereafter the bottle was held in a low temperature bath at −78° C. and 5.0 milliliters triisobutylaluminum solution in toluene (1 molar solution) and a mixture of 2 milliliters liquid propylene, 2 milliliters liquid butadiene and 2 milliliters toluene, were put successively into the bottle also employing the usual, dry, air-free technique. Thereafter the bottle was sealed and allowed to copolymerize at −30° C. for 14 hours. Yield of the alternating copolymer was 0.10 g. When the two components catalyst system consisting of 0.5 millimole titanium tetraiodide and 5.0 millimoles triisobutylaluminum was used and the other copolymerization conditions were the same as the example, yield of the alternating copolymer was 0.01 g.

Example 6

The usual, dry, air-free technique was employed and varying amounts of carbonyl group containing compound, 0.2 milliliter titanium tetrachloride solution in toluene (1 molar solution) and 6.5 milliliters toluene were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solutions) and a mixture of 2 milliliters liquid propylene, 2 milliliters liquid butadiene and 2 milliliters toluene were put successively into the bottle also employing the usual dry, air-free technique. Thereafter the bottle was sealed and allowed to copolymerize at −30° C. for 16 hours. The results are summarized in Table 4.

TABLE 4

| Experiment No. | Catalysts: $Al(i\text{-}Bu)_3$ (mmol) | Catalysts: $TiCl_4$ (mmol) | Catalysts: Carbonyl compound | Catalysts: Gram | MEK soluble fraction (g.) | Alternating copolymer, MEK Insoluble diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | Sodium oleate | 0.152 | 0.01 | 0.20 | | | |
| 2 | 2.0 | 0.2 | Aluminum stearate | 0.438 | 0.50 | 1.30 | 63 | 30 | 7 |
| 3 | 2.0 | 0.2 | Aluminum acetate | 0.102 | 0.01 | 0.20 | 75 | 20 | 5 |
| 4 | 2.0 | 0.2 | Tin (II) oxalate | 0.103 | 0.05 | 0.15 | 74 | 21 | 5 |
| 5 | 2.0 | 0.2 | Aluminum acetylacetonate | 0.162 | 0.05 | 0.22 | 82 | 15 | 3 |
| 6 | 2.0 | 0.2 | Hexacarbonyl molybdenum | 0.132 | 0.05 | 0.15 | 83 | 14 | 3 |
| Reference | 2.0 | 0.2 | | | | 0.03 | | | |

Example 7

Figure 2:
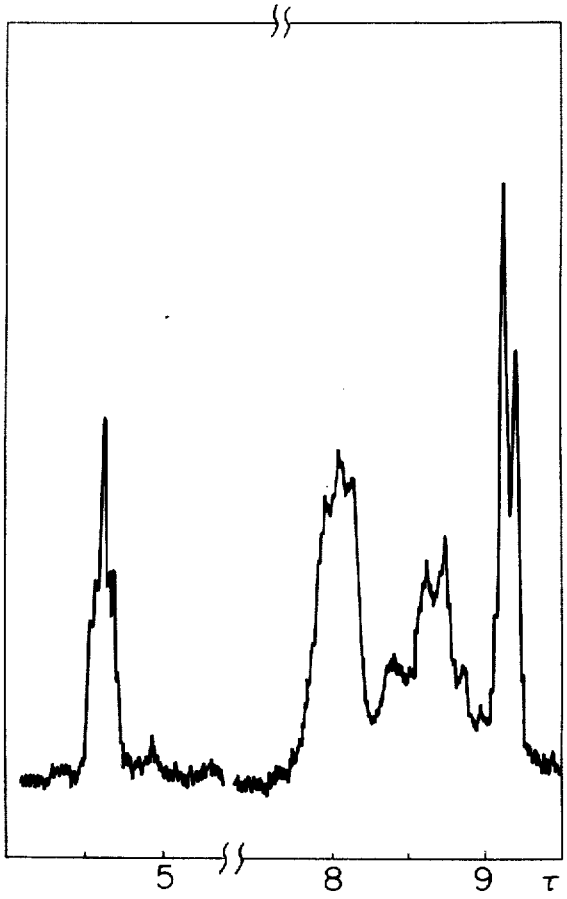
FIG. 2 shows the nuclear magnetic resonance spectrum of the copolymer.

The usual, dry, air-free technique was employed and 6.5 milliliters toluene, varying amounts of carbonyl group containing compound and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 5. In the table, $\eta$ means the intrinsic viscosity measured in chloroform at 30° C. FIG. 1 shows the infra-red spectrum of the methyl ethyl ketone insoluble and diethyl ether soluble alternating copolymer of butadiene and propylene prepared by the process of Exp. No. 3. FIG. 2 shows the nuclear magnetic resonance spectrum of the copolymer.

TABLE 5

| Experiment No. | Catalysts: $Al(i\text{-}Bu)_3$ (mmol) | Catalysts: $TiCl_4$ (mmol) | Catalysts: Carbonyl compound | Catalysts: Mmol | MEK soluble fraction (g.) | Alternating copolymer, MEK insoluble, diethyl ether soluble fraction: Yield (g.) | $[\eta]$ (dl./g.) | Microstructure of butadiene unit (percent): Trans- | Cis- | 1,2 |
|---|---|---|---|---|---|---|---|---|---|---|
| 1 | 2.0 | 0.2 | Acetic acid | 0.025 | 0.19 | 0.08 | | 55 | 38 | 7 |
| 2 | 2.0 | 0.2 | Acetic acid | 0.100 | 0.28 | 0.21 | | 67 | 24 | 9 |
| 3 | 2.0 | 0.2 | Acetic acid | 0.500 | 0.36 | 0.79 | | 66 | 29 | 5 |
| 4 | 2.0 | 0.2 | Acetic acid | 0.750 | 0.13 | 0.19 | | 66 | 28 | 6 |
| 5 | 2.0 | 0.2 | Isobutyl aldehyde | 0.250 | 0.26 | 0.23 | | 72 | 22 | 6 |
| 6 | 2.0 | 0.2 | Isobutyl aldehyde | 0.750 | 0.17 | 0.44 | 0.56 | 65 | 26 | 9 |
| 7 | 2.0 | 0.2 | Isobutyl aldehyde | 1.000 | 0.03 | 0.20 | | 60 | 32 | 8 |
| 8 | 2.0 | 0.2 | Acetone | 0.750 | 0.16 | 0.24 | | 69 | 25 | 6 |
| 9 | 2.0 | 0.2 | Benzoyl peroxide | 0.500 | 0.11 | 0.20 | 1.40 | 50 | 38 | 12 |
| 10 | 2.0 | 0.2 | Diphenyl acetic acid | 0.500 | 0.21 | 1.69 | 0.45 | 70 | 24 | 6 |
| 11 | 2.0 | 0.2 | α-chloropropionic acid | 0.500 | 0.14 | 0.94 | 0.36 | 62 | 28 | 10 |
| 12 | 2.0 | 0.2 | Caproic acid | 0.500 | 0.52 | 0.69 | 0.33 | 59 | 33 | 8 |
| 13 | 2.0 | 0.2 | Phthalic acid anhydride | 0.500 | 0.17 | 0.44 | 0.90 | 73 | 19 | 8 |

Example 8

The usual, dry, air-free technique was employed and 190 milliliters toluene, 0.8 milliliter propionic acid anhydride and 0.275 milliliter titanium tetrachloride were put successively in a 500 milliliters glass bottle at 25° C. Then the bottle was left alone at 25° C. for 10 minutes. Thereafter the bottle was held in a low temperature bath at −78° C. and 25 milliliters triisobutylaluminum solution in toluene (1 molar solution) and a mixture of 50 milliliters liquid propylene and 50 milliliters liquid butadiene were put successively into the bottle also employing the usual, dry, air-free technique. Thereafter the bottle was sealed and allowed to copolymerize at −30° C. for 42 hours. 58.0 g. alternating copolymer of butadiene and propylene was obtained. Its intrinsic viscosity was 2.26 (dl./g.) in chloroform at 30° C.

The vulcanization was carried out in the following way:

| | |
|---|---|
| | Parts |
| Copolymer | 100 |
| Oil furnace black (HAF) | 50 |
| Zinc oxide | 5 |
| Sulphur | 2 |
| Stearic acid | 1 |
| Phenyl-β-naphthyl amine | 1 |
| Benzothiazyl disulfide | 1 |

were mixed on a roller and vulcanized within 60 minutes at 150° C.

The product obtained by the vulcanization had the following values:

Elongation at break at 25° C.: 330%
Tensile strength at 25° C.: 193 kg./cm.$^2$
Modulus 300% at 25° C.: 182 kg./cm.$^2$ The microstructure of butadiene unit of the copolymer was as follows:

trans: 68%
cis: 26%
1.2: 6%

Example 9

The usual, dry, air-free technique was employed and 6.5 milliliters toluene, varying amounts of carbonyl group containing compound and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 6.

TABLE 6

| | Catalysts | | | | Alternating copolymer | | | | |
|---|---|---|---|---|---|---|---|---|---|
| | | | | | MEK Insoluble, diethyl ether soluble fraction | | | | |
| | | | | | | | Microstructure of butadiene unit (percent) | | |
| Experiment No. | Al(i-Bu)$_3$ (mmol) | TiCl$_4$ (mmol) | Carbonyl compound | Gram | MEK soluble fraction (g.) | Yield (g.) | Trans- | Cis- | 1,2- |
| 1 | 2.0 | 0.2 | Azodicarbonamide | 0.06 | 0.12 | 0.11 | | | |
| 2 | 2.0 | 0.2 | Chloroacetamide | 0.047 | 0.13 | 0.10 | | | |
| 3 | 2.0 | 0.2 | Phenylisocyanate | [1]0.054 | 0.19 | 0.05 | | | |
| 4 | 2.0 | 0.2 | Phenylurethane | 0.083 | 0.24 | 0.35 | 61 | 34 | 5 |
| 5 | 2.0 | 0.2 | Benzohydroxamic acid | 0.07 | 0.09 | 0.10 | | | |
| Reference | 2.0 | 0.2 | | | | 0.03 | | | |

[1]Milliliter.

Example 10

The usual, dry, air-free technique was employed and 7.5 milliliters toluene, 0.1 millimole titanium tetrachloride and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 21 hours. The results are summarized in Table 7.

TABLE 7

| | Catalysts | | | | Alternating copolymer | | | |
|---|---|---|---|---|---|---|---|---|
| | | | | | | Microstructure of butadiene unit (percent) | | |
| Experiment No. | Al(i-Bu)$_3$ (mmol) | TiCl$_4$ (mmol) | Carbonyl compound | Mmol | Yield (g.) | Trans- | Cis- | 1,2- |
| 1 | 1.0 | 0.1 | Terephthaldehyde | 0.25 | 0.25 | | | |
| 2 | 1.0 | 0.1 | Glycolic acid | 0.25 | 0.33 | | | |
| 3 | 0.5 | 0.1 | Carbon dioxide | 0.25 | 0.15 | | | |
| 4 | 0.5 | 0.1 | Acetophenone | 0.10 | 1.90 | 82 | 15 | 3 |
| 5 | 1.0 | 0.1 | Benzil | 0.25 | 0.25 | | | |
| 6 | 1.0 | 0.1 | Polyvinylacetate | [1]0.01 | 0.17 | | | |
| 7 | 1.0 | 0.1 | Tartaric acid | 0.25 | 0.15 | | | |
| Reference 1 | 1.0 | 0.1 | | | 0.02 | | | |
| Reference 2 | 0.5 | 0.1 | | | 0.04 | | | |

[1]Gram.

Example 11

The usual, dry, air-free technique was employed and 7.5 milliliters toluene, 0.1 millimole titanium tetrabromide and varying amounts of carbonyl group containing compound were put successively in a 25 milliliters glass bottle at 25° C. Then the bottle was left alone at 25° C. for 10 minutes. Thereafter the bottle was held in a low temperature bath and varying amounts of triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 21 hours. The results are summarized in Table 8.

TABLE 8

| Experiment No. | Catalysts: $Al(i\text{-}Bu)_3$ (mmol) | Catalysts: $TiBr_4$ (mmol) | Catalysts: Carbonyl compound | Catalysts: Mmol | Alternating copolymer: Yield (g.) | Microstructure of butadiene unit (percent): Trans- | Cis- | 1,2- |
|---|---|---|---|---|---|---|---|---|
| 1 | 1.0 | 0.1 | Benzalacetophenone | 0.25 | 0.97 | | | |
| 2 | 1.0 | 0.1 | Diketene | 0.25 | 0.12 | | | |
| 3 | 0.5 | 0.1 | p-Methoxybenzoic acid | 0.10 | 0.57 | | | |
| 4 | 0.5 | 0.1 | p-Benzoquinone | 0.10 | 0.14 | 68 | 25 | 7 |
| 5 | 0.5 | 0.1 | Polymethylmethacrylate | [1]0.01 | 0.20 | | | |
| Reference 1 | 1.0 | 0.1 | | | 0.02 | | | |
| Reference 2 | 0.5 | 0.1 | | | 0.04 | | | |

[1]Gram.

Example 12

The usual, dry, air-free technique was employed and 7.5 milliliters toluene, 0.1 millimole titanium tetrachloride and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 9.

TABLE 9

| Experiment No. | Catalysts: $Al(i\text{-}Bu)_3$ (mmol) | Catalysts: $TiCl_4$ (mmol) | Catalysts: Carbonyl compound | Catalysts: Mmol | MEK soluble fraction (g.) | Alternating copolymer, MEK Insoluble, diethyl ether soluble fraction: Yield (g.) | Microstructure of butadiene unit (percent): Trans- | Cis- | 1,2- |
|---|---|---|---|---|---|---|---|---|---|
| 1 | 1.0 | 0.1 | Phosgene | 0.1 | 0.07 | 0.24 | 85 | 13 | 2 |
| 2 | 1.0 | 0.1 | Phosgene | 0.2 | 0.10 | 0.17 | | | |
| 3 | 1.0 | 0.1 | Acetyl chloride | 0.25 | 0.18 | 0.53 | | | |
| 4 | 1.0 | 0.1 | Titanium oxydiacetylacetonate | [1]0.05 | 0.13 | 0.10 | | | |
| 5 | 1.0 | 0.1 | Zinc carbonate | [1]0.05 | 0.05 | 0.12 | | | |
| 6 | 1.0 | 0.1 | Sodium carbonate | [1]0.05 | 0.08 | 0.10 | | | |
| 7 | 1.0 | 0.1 | Dimethyl carbonate | 0.1 | 0.22 | 0.34 | 76 | 19 | 5 |

[1]Gram.

Example 13

The usual, dry, air-free technique was employed and 7.5 milliliters toluene, 0.2 milliliter titanium tetrachloride and 0.5 millimole carbonyl group containing compound were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 10.

TABLE 10

| Experiment No. | Catalysts: $Al(i\text{-}Bu)_3$ (mmol) | Catalysts: $TiCl_4$ (mmol) | Catalysts: Carbonyl compound | Catalysts: Mmol | MEK soluble fraction (g.) | Alternating copolymer, MEK insoluble, diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | Trimethyl acetic acid | 0.5 | 0.42 | 0.56 | | | |
| 2 | 2.0 | 0.2 | Crotonic acid | 0.5 | 0.20 | 0.35 | 68 | 28 | 4 |
| 3 | 2.0 | 0.2 | Trichloro acetic acid | 0.5 | 0.03 | 0.18 | | | |
| 4 | 2.0 | 0.2 | Isobutyric acid anhydride | 0.5 | 0.14 | 1.29 | 65 | 29 | 6 |
| 5 | 2.0 | 0.2 | Crotonic acid anhydride | 0.5 | 0.04 | 0.57 | 72 | 23 | 5 |
| 6 | 2.0 | 0.2 | Benzoic acid anhydride | 0.5 | 0.10 | 0.80 | | | |
| 7 | 2.0 | 0.2 | n-Butyric acid | 0.5 | 0.62 | 0.80 | 66 | 29 | 7 |

Example 14

The usual, dry, air-free technique was employed and 7.0 milliliters toluene, 0.1 millimole titanium tetrachloride and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize for 16 hours at 0° C. or −55° C. The results are summarized in Table 11.

TABLE 11

| Experiment No. | Catalysts: Al(i-Bu)$_3$ (mmol) | Catalysts: $TiCl_4$ (mmol) | Catalysts: Carbonyl compound | Catalysts: Mmol | Polymerization temperature (°C.) | Alternating copolymer: MEK soluble fraction (g.) | Alternating copolymer: MEK insoluble, diethyl ether soluble fraction: (percent) Yield (g.) | Microstructure of butadiene unit (percent): Trans- | Cis- | 1,2 |
|---|---|---|---|---|---|---|---|---|---|---|
| 1 | 0.5 | 0.1 | Acetophenone | 0.1 | −55 | 0.02 | 0.27 | 88 | 8 | 4 |
| 2 | 0.5 | 0.1 | Acetophenone | 0.1 | 0 | 0.16 | 0.29 | 70 | 23 | 7 |
| 3 | 0.5 | 0.1 | Isobutyl aldehyde | 0.1 | −55 | 0.01 | 0.29 | 76 | 20 | 4 |
| 4 | 0.5 | 0.1 | Isobutyl aldehyde | 0.1 | 0 | 0.14 | 0.20 | 62 | 28 | 10 |
| 5 | 1.0 | 0.1 | Propionic acid anhydride | 0.25 | −55 | 0.01 | 0.13 | 81 | 16 | 3 |
| 6 | 1.0 | 0.1 | Propionic acid anhydride | 0.25 | 0 | 0.06 | 1.14 | 69 | 27 | 4 |

Example 15

The usual, dry, air-free technique was employed and varying amounts of carbonyl group containing compound, 6.5 milliliters toluene and varying amounts of titanium tetrachloride were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 12.

TABLE 12

| Experiment No. | Catalysts: Al(i-Bu)$_3$ (mmol) | Catalysts: $TiCl_4$ (mmol) | Catalysts: Carbonyl compound* | Catalysts: Mmol. | Alternating copolymer: MEK soluble fraction (g.) | MEK insoluble, diethyl ether soluble fraction: Yield (g.) | Microstructure of butadiene unit (percent): Trans- | Cis- | 1,2- |
|---|---|---|---|---|---|---|---|---|---|
| 1 | 2.0 | 0.2 | $TiCl_3(OC(=O)CH_3)$ | 0.16 | 0.18 | 0.06 | 66 | 28 | 6 |
| 2 | 2.0 | 0.5 | $Ti(Oi-Pr)_2(OC(=O)CH_3)_3$ | 0.20 | 0.17 | 0.15 | | | |
| 3 | 2.0 | 0.5 | $O[Ti(OC(=O)CH_3)_3]_3$ | 0.20 | 0.32 | 1.71 | 63 | 32 | 5 |

*i-Pr=Isopropyl; i-Bu=Isobutyl.

Example 16

The usual, dry, air-free technique was employed and 7.0 milliliters toluene, 0.1 millimole titanium tetrachloride and varying amounts of carbonyl containing compound were put successively in a 25 milliliters glass bottle at 25° C. Then the bottle was left alone at 25° C. for 10 minutes. Thereafter the bottle was held in a low temperature bath at −78° C. and varying amounts of organoaluminum solution in toluene (1 molar solution), 2 milliliters liquid butadiene and 3.1 milliliters liquid 4-methyl pentene-1 were put successively into the bottle also employing the usual, dry, air-free technique. Thereafter the bottle was sealed and allowed to copolymerize at −30° C. for 16 hours. The results are summarized in Table 13.

The following results support the conclusion that the copolymer is an alternating copolymer of butadiene and 4-methyl pentene-1.

(1) The composition of the copolymer according to the NMR analysis substantially agrees with the calculated value for the 1:1 copolymer of butadiene and 4-methyl pentene-1.

(2) The copolymerization reaction gives 1:1 copolymer over a wide range of initial monomer composition.

(3) The copolymerization reaction gives 1:1 copolymer independently of polymerization time.

TABLE 13

| Experiment No. | Catalysts: Organo-aluminum compound* | Mmol | $TiCl_4$ (mmol) | Carbonyl compound | Mmol | Alternating copolymer: MEK soluble fraction (g.) | MEK insoluble, diethyl ether soluble fraction (g.) |
|---|---|---|---|---|---|---|---|
| 1 | $AlEt_3$ | 0.5 | 0.1 | Isobutyl aldehyde | 0.10 | 0.02 | 0.03 |
| 2 | $AlEt_3$ | 1.0 | 0.1 | Propionic acid anhydride | 0.25 | 0.05 | 0.26 |
| 3 | $Al(i\text{-}Bu)_3$ | 1.0 | 0.1 | Propionic acid anhydride | 0.25 | 0.03 | 0.87 |
| 4 | $Al(i\text{-}Bu)_3$ | 0.5 | 0.1 | Acetophenone | 0.10 | 0.06 | 1.05 |
| 5 | $Al(i\text{-}Bu)_3$ | 0.5 | 0.1 | Acetone | 0.10 | 0.05 | 0.31 |
| 6 | $Al(i\text{-}Bu)_3$ | 1.0 | 0.1 | Acetic acid | 0.25 | 0.11 | 0.32 |
| 7 | $Al(i\text{-}Bu)_3$ | 0.5 | 0.1 | | | | 0.02 |
| Reference | $AlEt_3$ | 0.5 | 0.1 | | | | 0 |

*Et=Ethyl; i-Bu=Isobutyl.

Figure 3:
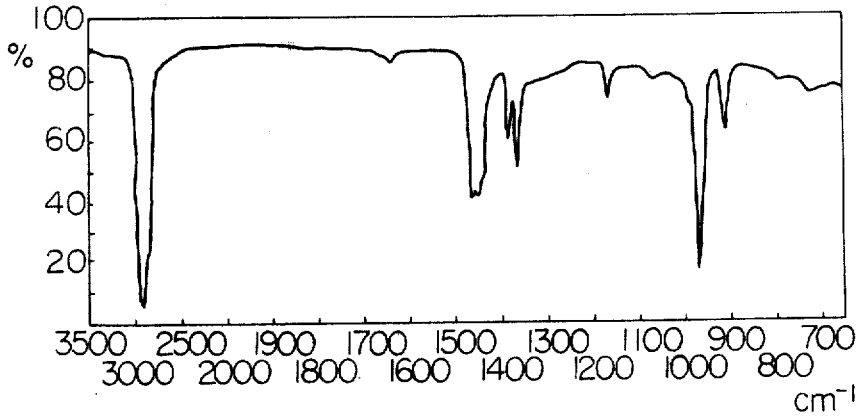
FIG. 3 shows the infra-red spectrum of the methyl ethyl ketone insoluble and diethyl ether soluble alternating copolymer of butadiene and 4-methyl pentene-1 prepared by the process of this invention.
Figure 4:
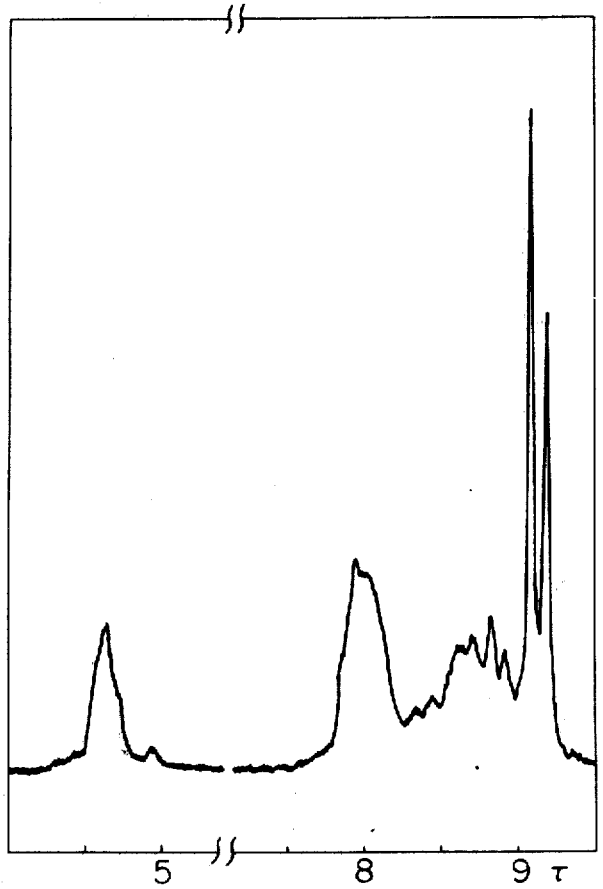
FIG. 4 shows the nuclear magnetic resonance spectrum of the copolymer.

FIG. 3 shows the infra-red spectrum of the methyl ethyl ketone insoluble and diethyl ether soluble alternating copolymer of butadiene and 4-methyl-pentene-1 prepared by the process of Exp. No. 4. FIG. 4 shows the nuclear magnetic resonance spectrum of the copolymer.

Example 17

The usual, dry, air-free technique was employed and 7.0 milliliters toluene, 0.1 millimole titanium tetrahalide and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and varying amounts of organoaluminum solution in toluene (1 molar solution), 2 milliliters liquid butadiene and 2.8 milliliters liquid pentene-1 were put successively into the bottle also employing the usual, dry, air-free technique. Thereafter the bottle was sealed and allowed to copolymerize at −30° C. for 16 hours. The results are summarized in Table 14.

The following results support the conclusion that the copolymer is an alternating copolymer of butadiene and pentene-1.

(1) The composition of the copolymer according to the NMR analysis substantially agrees with the calculated value for the 1:1 copolymer of butadiene and pentene-1.

(2) The copolymerization reaction gives 1:1 copolymer over a wide range of initial monomer composition.

(3) The copolymerization reaction gives 1:1 copolymer independently of polymerization time.

Figure 5:
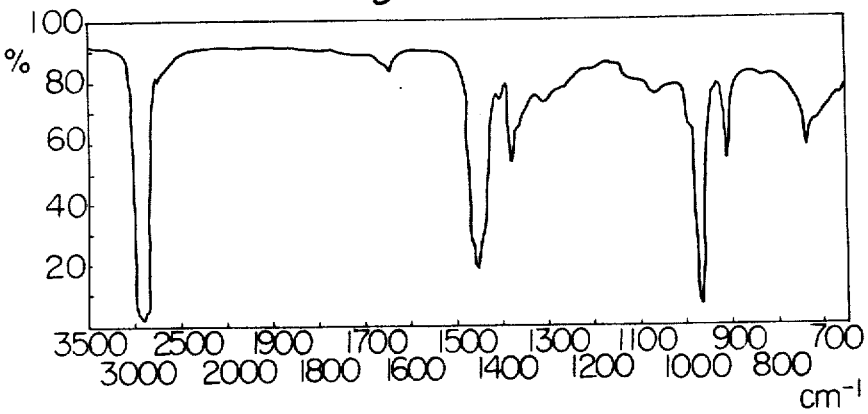
FIG. 5 shows the infra-red spectrum of the methyl ethyl ketone insoluble and diethyl ether soluble alternating copolymer of butadiene and pentene-1 prepared by the process of this invention.
Figure 6:
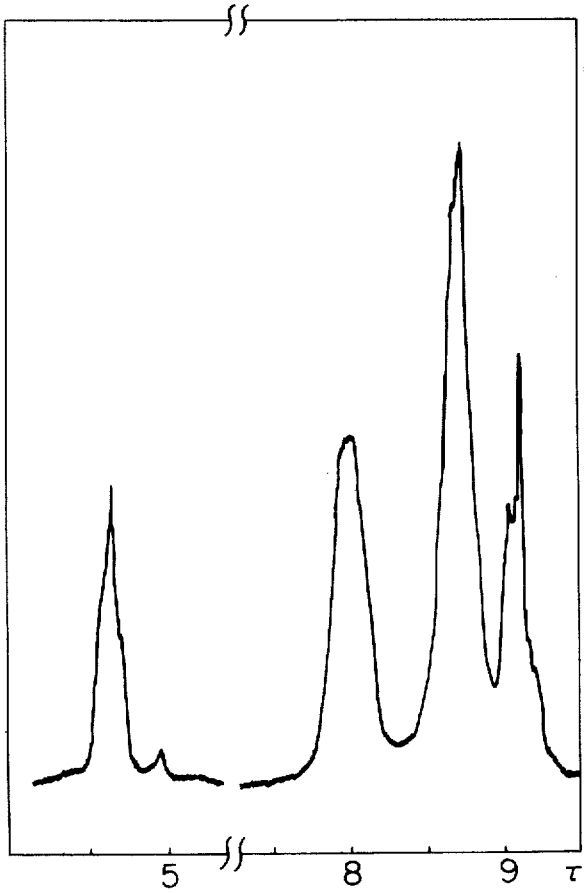
FIG. 6 shows the nuclear magnetic resonance spectrum of the copolymer.

FIG. 5 shows the infra-red spectrum of the methyl ethyl ketone insoluble and diethyl ether soluble alternating copolymer of butadiene and pentene-1 prepared by the process of Exp. No. 5. FIG. 6 shows the nuclear magnetic resonance spectrum of the copolymer.

Example 18

The usual, dry, air-free technique was employed and 7.0 milliliters, 0.1 millimole titanium tetrahalide and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and varying amounts or organoaluminum compound in toluene (1 molar solution), 2 milliliters liquid butadiene and 2 milliliters liquid butene-1 were put successively into the bottle also employing the usual, dry, air-free technique. Thereafter the bottle was sealed and allowed to copolymerize at −30° C. for 16 hours. The results are summarized in Table 15.

The following results support the conclusion that the copolymer is an alternating copolymer of butadiene and butene-1.

(1) The composition of the copolymer according to the NMR analysis substantially agrees with the calculated value for the 1:1 copolymer of butadiene and butene-1.

(2) The copolymerization reaction gives 1:1 copolymer over a wide range of initial monomer composition.

(3) The copolymerization reaction gives 1:1 copolymer independently of polymerization time.

TABLE 14

| Experiment No. | Catalysts: Organo-aluminum compound* | Mmol | Titanium tetrahalide | Mmol | Carbonyl compound | Mmol | Alternating copolymer: MEK soluble fraction (g.) | MEK insoluble, diethyl ether soluble fraction (g.) |
|---|---|---|---|---|---|---|---|---|
| 1 | $AlEt_3$ | 0.5 | $TiCl_4$ | 0.1 | Acetophenone | 0.10 | 0.03 | 0.06 |
| 2 | $Al(i\text{-}Bu)_3$ | 0.5 | $TiCl_4$ | 0.1 | " | 0.10 | 0.06 | 1.02 |
| 3 | $Al(i\text{-}Bu)_3$ | 0.5 | $TiCl_4$ | 0.1 | Isobutylaldehyde | 0.10 | 0.03 | 0.43 |
| 4 | $Al(i\text{-}Bu)_3$ | 0.5 | $TiBr_4$ | 0.1 | " | 0.10 | 0.01 | 0.13 |
| 5 | $Al(i\text{-}Bu)_3$ | 1.0 | $TiCl_4$ | 0.1 | Acetic acid | 0.25 | 0.08 | 0.49 |
| 6 | $Al(i\text{-}Bu)_3$ | 1.0 | $TiCl_4$ | 0.1 | $TiCl_3(O\overset{O}{\overset{\|}{C}}CH_3)$ | 0.02 | 0.08 | 0.11 |
| 7 | $Al(i\text{-}Bu)_3$ | 1.0 | $TiCl_4$ | 0.1 | Same as above | 0.10 | 0.17 | 0.84 |
| 8 | $Al(i\text{-}Bu)_3$ | 1.0 | $TiCl_4$ | 0.1 | Propionic acid anhydride | 0.25 | 0.01 | 0.17 |
| 9 | $Al(i\text{-}Bu)_3$ | 1.0 | $TiCl_4$ | 0.1 | Isobutyric anhydride | 0.25 | 0.02 | 0.19 |
| 10 | $Al(i\text{-}Bu)_3$ | 1.0 | $TiCl_4$ | 0.1 | Acetone | 0.10 | 0.02 | 0.76 |
| 11 | $Al(i\text{-}Bu)_3$ | 0.5 | $TiCl_4$ | 0.1 | | | | 0.08 |
| Reference | $AlEt_3$ | 0.5 | $TiCl_4$ | 0.1 | | | | 0.02 |

*Et=Ethyl; i-Bu=Isobutyl.

TABLE 15

| Experiment No. | Catalysts: Organo-aluminum compound* | Mmol | Titanium tetrahalide | Mmol | Carbonyl compound | Mmol | Alternating copolymer: MEK soluble fraction (g.) | MEK insoluble, diethyl ether soluble fraction (g.) |
|---|---|---|---|---|---|---|---|---|
| 1 | $AlEt_3$ | 0.5 | $TiCl_4$ | 0.1 | Acetophenone | 0.10 | 0.06 | 0.15 |
| 2 | $Al(i\text{-}Bu)_3$ | 0.5 | $TiCl_4$ | 0.1 | Isobutyl aldehyde | 0.10 | 0.06 | 0.26 |
| 3 | $Al(i\text{-}Bu)_3$ | 1.0 | $TiCl_4$ | 0.1 | Isoamyl acetate | 0.25 | 0.04 | 0.14 |
| 4 | $Al(i\text{-}Bu)_3$ | 0.5 | $TiCl_4$ | 0.1 | Benzophenone | 0.10 | 0.04 | 0.70 |
| 5 | $Al(i\text{-}Bu)_3$ | 1.0 | $TiBr_4$ | 0.1 | Acetic acid | 0.25 | 0.08 | 0.11 |
| 6 | $Al(i\text{-}Bu)_3$ | 1.0 | $TiBr_4$ | 0.1 | Acetone | 0.25 | 0.03 | 0.05 |
| 7 | $Al(i\text{-}Bu)_3$ | 0.5 | $TiBr_4$ | 0.1 | Acetophenone | 0.10 | 0.05 | 1.26 |
| 8 | $Al(i\text{-}Bu)_3$ | 0.5 | $TiCl_4$ | 0.1 | | | | 0.03 |
| Reference | $AlEt_3$ | 0.5 | $TiCl_4$ | 0.1 | | | | 0 |

*Et=Ethyl; i-Bu=Isobutyl.

Figure 7:
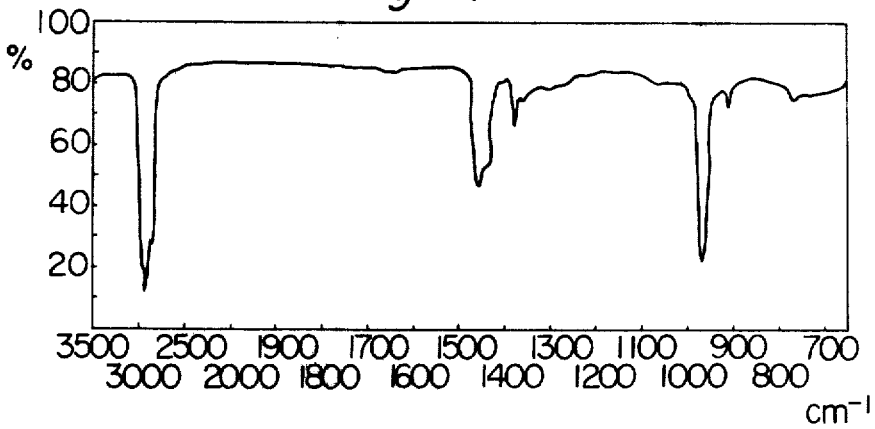
FIG. 7 shows the infra-red spectrum of the methyl ethyl ketone insoluble and diethyl ether soluble alternating copolymer of butadiene and butene-1 prepared by the process of this invention.
Figure 8:
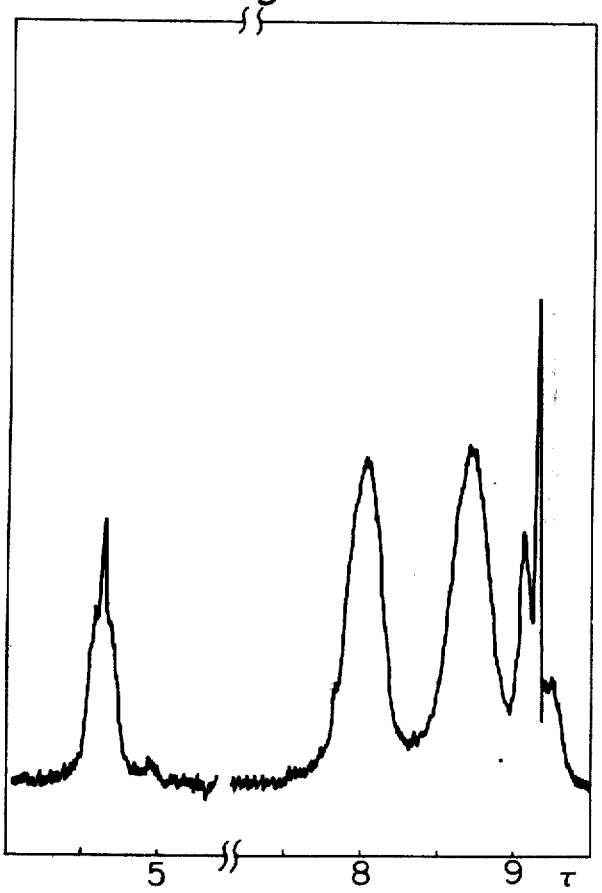
FIG. 8 shows the nuclear magnetic resonance spectrum of the copolymer.

FIG. 7 shows the infra-red spectrum of the methyl ethyl ketone insoluble and diethyl ether soluble alternating copolymer of butadiene and butene-1 prepared by the process of Exp. No. 4. FIG. 8 shows the nuclear magnetic resonance spectrum of the copolymer.

Example 19

The usual, dry, air-free technique was employed and 5.0 milliliters toluene, 0.1 millimole titanium tetrahalide and varying amounts of carbonyl group containing compound were put successively in a 25 milliliters glass bottle at 25° C. Then the bottle was left alone at 25° C. for 10 minutes. Thereafter the bottle was held in a low temperature bath at −78° C. and varying amounts of organoaluminum solution in toluene (1 molar solution), 3 milliliters styrene and 2 milliliters liquid butadiene were put successively into the bottle also employing the usual, dry, air-free technique. Thereafter the bottle was sealed and allowed to copolymerize at −30° C. for 21 hours. The results are summarized in Table 16.

The following results support the conclusion that the copolymer is an alternating copolymer of butadiene and styrene.

(1) The composition of the copolymer according to the NMR analysis substantially agrees with the calculated value for the 1:1 copolymer of butadiene and styrene.

(2) The copolymerization reaction gives 1:1 copolymer over a wide range of initial monomer composition.

(3) The copolymerization reaction gives 1:1 copolymer independently of polymerization time.

Figure 9:
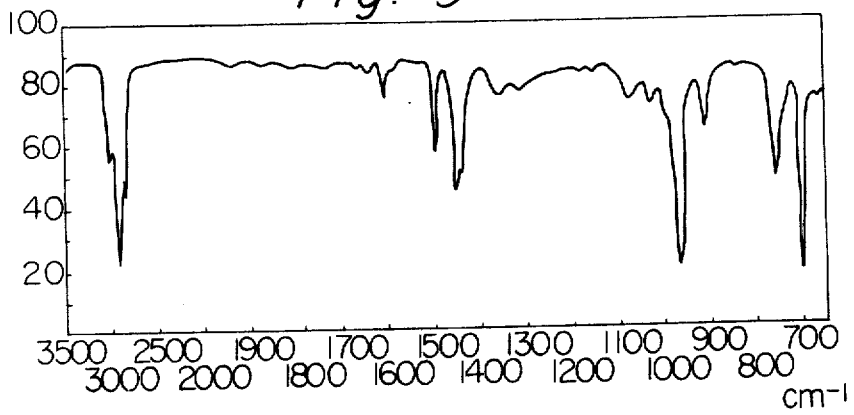
FIG. 9 shows the infra-red spectrum of the alternating copolymer of butadiene and styrene prepared by the process of this invention.
Figure 10:
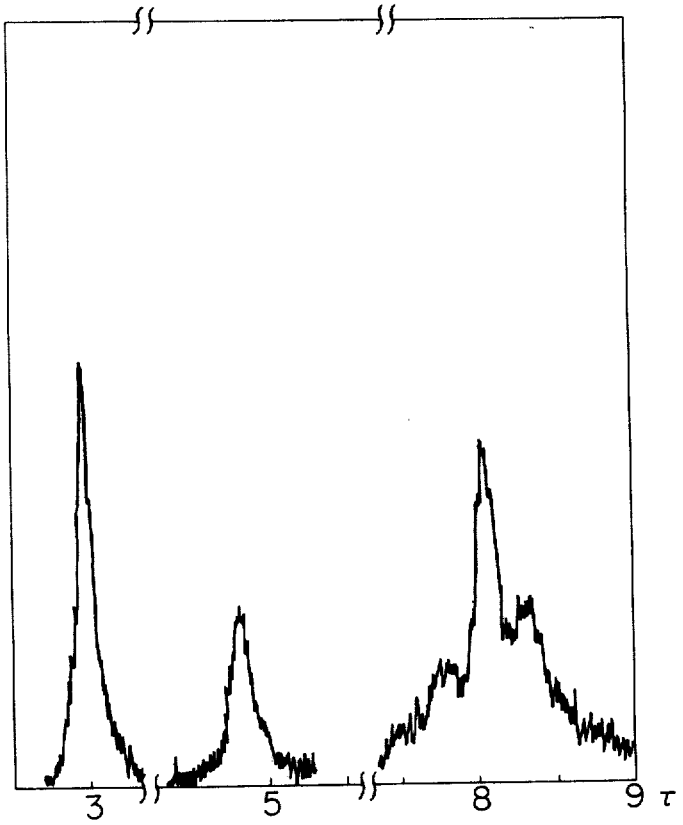
FIG. 10 shows the nuclear magnetic resonance spectrum of the copolymer.

FIG. 9 shows the infra-red spectrum of the alternating copolymer of butadiene and styrene prepared by the process of Exp. No. 8. FIG. 10 shows the nuclear magnetic resonance spectrum of the copolymer.

Example 20

The usual, dry, air-free technique was employed and 4.0 milliliters toluene, 0.2 millimole titanium tetrachloride and 0.2 millimole carbonyl containing compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution) and 6 milliliters liquid B—B fraction were put successively into the bottle also employing the usual, dry, air-free technique. Thereafter the bottle was sealed and allowed to copolymerize at −30° C. for 24 hours. Alternating copolymer of butadiene and butene-1 was obtained. The results are summarized in Table 17. The mole fraction of B—B fraction used was as follows:

| | Mole percent |
|---|---|
| Propane | 0.03 |
| Propylene | 0.05 |
| Methyl acetylene | 0.69 |
| Isobutane | 0.52 |
| n-Butane | 3.67 |
| Isobutylene | 26.22 |
| Butene-1 | 14.18 |
| Trans-butene-2 | 5.18 |
| Cis-butene-2 | 4.12 |
| 1,3-butadiene | 44.02 |
| 1,2-butadiene | 0.52 |
| Ethyl acetylene | 0.16 |
| Vinyl acetylene | 0.64 |

TABLE 16

| Experiment No. | Catalysts: Organo-aluminum compound* | Mmol | Titanium tetrahalide | Mmol | Carbonyl compound | Mmol | Alternating copolymer (g.) |
|---|---|---|---|---|---|---|---|
| 1 | $Al(i\text{-}Bu)_3$ | 1.0 | $TiCl_4$ | 0.1 | | | 0.03 |
| 2 | $Al(i\text{-}Bu)_3$ | 0.5 | $TiCl_4$ | 0.1 | Acetic acid | 0.10 | 0.05 |
| 3 | $Al(i\text{-}Bu)_3$ | 0.5 | $TiCl_4$ | 0.1 | Propionic acid anhydride | 0.10 | 0.05 |
| 4 | $Al(i\text{-}Bu)_3$ | 1.0 | $TiCl_4$ | 0.1 | " | 0.25 | 0.25 |
| 5 | $Al(i\text{-}Bu)_3$ | 0.5 | $TiBr_4$ | 0.1 | p-Benzoquinone | 0.10 | 0.07 |
| 6 | $Al(i\text{-}Bu)_3$ | 0.5 | $TiBr_4$ | 0.1 | Terephthal aldehyde | 0.10 | 0.11 |
| 7 | $AlEt_3$ | 0.5 | $TiBr_4$ | 0.1 | Propionic acid anhydride | 0.10 | 0.04 |
| 8 | $Al(i\text{-}Bu)_3$ | 1.0 | $TiCl_4$ | 0.1 | $TiCl_3(OC(=O)CH_3)$ | 0.10 | 0.38 |
| Reference | $AlEt_3$ | 0.5 | $TiCl_4$ | 0.1 | | | 0 |

*Et=Ethyl; i-Bu=Isobutyl.

TABLE 17

| Experiment No. | Catalysts: $Al(i\text{-}Bu)_3$ (mmol) | Catalysts: $TiCl_4$ (mmol) | Catalysts: Carbonyl compound | Mmol | Alternating copolymer: MEK soluble fraction (g.) | Alternating copolymer: MEK insoluble, diethyl ether soluble fraction (g.) |
|---|---|---|---|---|---|---|
| 1 | 1.0 | 0.2 | Acetophenone | 0.2 | 0.14 | 0.02 |
| 2 | 2.0 | 0.2 | $TiCl_3(OC(=O)CH_3)$ | 0.2 | 0.16 | 0.56 |

Example 21

The usual, dry, air-free technique was employed and 7.0 milliliters toluene, 1.0 milliliter triisobutylaluminum solution in toluene (1 molar solution), 0.25 millimole propionic acid anhydride, 0.1 millimole titanium tetrachloride and a mixture of 2 milliliters liquid propylene, 2 milliliters liquid butadiene and 2 milliliters toluene were put successively into a 25 milliliters glass bottle at −78° C. Then the bottle was sealed and allowed to copolymerize at −30° C. for 15 hours. The yield of the alternating copolymer of butadiene and propylene was 0.13 g.

Example 22

The usual, dry, air-free technique was employed and 1.0 millimole butadiene, 0.25 millimole propionic acid anhydride and 0.1 millimole titanium tetrachloride were put successively into a 25 milliliters glass bottle at 25° C. Then the bottle was held in a low temperature bath at −78° C. and 10 milliliters triisobutylaluminum solution in toluene (1 mole solution) and a mixture of 3 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 15 hours. The yield of the alternating copolymer of butadiene and propylene was 0.65 g. and the microstructure of butadiene unit of the copolymer was as follows:
trans: 70%
cis: 22%
1,2: 8%

Example 23

The usual, dry, air-free technique was employed and a mixture of 2 milliliters liquid propylene, 2 milliliters liquid butadiene and 2 milliliters toluene, 0.18 millimole titanium tetrachloride, 0.6 milliliter of triisobutylaluminum solution in toluene (1 molar solution) and 0.12 millimole acetophenone were put successively at intervals of 10 minutes into a 25 milliliters glass bottle at −78° C. Thereafter the bottle was sealed and allowed to copolymerize at −40° C. for 4.5 hours. The yield of the alternating copolymer of butadiene and propylene was 0.60 g. and the microstructure of butadiene unit of the copolymer was as follows:
trans: 92%
cis: 6%
1.2: 2%

Example 24

The usual, dry, air-free technique was employed and a mixture of 2 milliliters liquid propylene, 2-milliliters liquid butadiene and 2 milliliters toluene, 0.18 millimole titanium tetrachloride, 0.12 millimole acetophenone and 0.6 milliliter triisobutylaluminum solution in toluene (1 molar solution) were put successively at intervals of 10 minutes into a 25 milliliters glass bottle at −78° C. Thereafter the bottle was sealed and allowed to copolymerize at −40° C. for 4.5 hours. The yield of the alternating copolymer of butadiene and propylene was 1.05 g. and the microstructure of butadiene unit of the copolymer was as follows:
trans: 91%
cis: 7%
1.2: 2%

Example 25

The usual, dry, air-free technique was employed and a mixture of 2 milliliters liquid propylene, 2 milliliters liquid butadiene and 2 milliliters toluene, 0.6 milliliter triisobutylaluminum solution in toluene (1 molar solution), 0.12 millimole acetophenone and 0.18 millimole titanium tetrachloride were put successively at intervals of 10 minutes into a 25 milliliters glass bottle at −78° C. Thereafter the bottle was sealed and allowed to polymerize at −40° C. for 4.5 hours. The yield of the alternating copolymer of butadiene and propylene was 1.01 g.

Example 26

The usual, dry, air-free technique was employed and a mixture of 2 milliliters liquid propylene, 2 milliliters toluene, 0.12 millimole acetophenone, 0.18 millimole titanium tetrachloride and 0.6 milliliter triisobutylaluminum solution in toluene (1 molar solution) were put successively at intervals of 10 minutes into a 25 milliliters glass bottle at −78° C. Thereafter the bottle was sealed and allowed to copolymerize at −40° C. for 4.5 hours. The yield of the alternating copolymer of butadiene and propylene was 1.06 g.

Example 27

The usual, dry, air-free technique was employed and 0.05 g. metal oxide or metalloid oxide, 6.5 milliliters toluene, 0.2 milliliter titanium tetrachloride solution in toluene (1 molar solution) and 0.5 millimole carbonyl group containing compound were put successively in a 25 milliliters glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 18. As can be seen in Table 18, the yield of the high molecular weight alternating copolymer of butadiene and propylene increased by adding metal oxide or metalloid oxide to the three components catalyst system of organoaluminum compound, titanium tetrahalide and carbonyl compound.

TABLE 18

| Experiment No. | Catalysts: $Al(i\text{-}Bu)_3$ (mmol) | $TiCl_4$ (mmol) | Carbonyl compound | Mmol | Metal oxide or metalloid oxide | Gram | Alternating copolymer: MEK soluble fraction (g.) | MEK insoluble, diethyl ether soluble fraction (g.) |
|---|---|---|---|---|---|---|---|---|
| 1 | 2.0 | 0.2 | Monochloroacetic acid | 0.5 | Titanium dioxide | 0.05 | 0.23 | *0.82 |
| Reference 1 | 2.0 | 0.2 | " | 0.5 | | | 0.17 | 0.29 |
| 2 | 2.0 | 0.2 | Ethyl acetate | 0.5 | Alumina | 0.05 | 0.17 | 0.48 |
| Reference 2 | 2.0 | 0.2 | " | 0.5 | | | 0.09 | 0.14 |
| 3 | 2.0 | 0.2 | " | 0.5 | Vanadium pentoxide | 0.05 | 0.23 | 0.56 |
| 4 | 2.0 | 0.2 | Diethyl malonate | 0.5 | Silica | 0.05 | 0.22 | 0.15 |
| Reference 3 | 2.0 | 0.2 | " | 0.5 | | | 0.08 | 0.04 |
| 5 | 2.0 | 0.2 | Benzophenone | 0.5 | Zirconium dioxide | 0.05 | 1.48 | 0.67 |
| Reference 4 | 2.0 | 0.2 | " | 0.5 | | | 0.23 | 0.47 |
| 6 | 2.0 | 0.2 | Acetone | 0.5 | Titanium dioxide | 0.05 | 0.24 | 0.22 |
| Reference 5 | 2.0 | 0.2 | " | 0.5 | | | 0.24 | 0.13 |
| 7 | 2.0 | 0.2 | Acetic acid anhydride | 0.5 | Magnesia | 0.05 | 0.12 | 0.93 |
| Reference 6 | 2.0 | 0.2 | " | 0.5 | | | 0.13 | 0.83 |

*Butadiene microstructure: Trans=73%, Cis=12%; 1.2=5%.

Example 28

The usual, dry, air-free technique was employed and 6.0 milliliters toluene, 0.5 millimole carbonyl group containing compound, 0.2 milliliter titanium tetrachloride solution in toluene (1 molar solution) and 0.2 millimole halogen or halogen compound were put successviely in a 25 milliliters glass bottle at 25° C. Then the bottle was left alone at 25° C. for 10 minutes. Thereafter, the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 19.

TABLE 19

| Experiment No. | Catalysts: $Al(i\text{-}Bu)_3$ (mmol) | $TiCl_4$ (mmol) | Carbonyl compound | Mmol | Halogen or halogen compound | Mmol | Alternating copolymer: MEK soluble fraction (g.) | MEK insoluble, diethyl ether soluble fraction (g.) |
|---|---|---|---|---|---|---|---|---|
| 1 | 2.0 | 0.2 | Benzophenone | 0.5 | Stannic chloride | 0.2 | 0.16 | 0.79 |
| Reference 1 | 2.0 | 0.2 | " | 0.5 | | | 0.23 | 0.57 |
| 2 | 2.0 | 0.2 | Benzoyl peroxide | 0.5 | tert-Butyl chloride | 0.2 | 0.12 | 0.25 |
| Reference 2 | 2.0 | 0.2 | " | 0.5 | | | 0.11 | 0.20 |
| 3 | 2.0 | 0.2 | Ethyl acetate | 0.5 | Ethylaluminum dichloride. | 0.2 | 0.10 | *0.54 |
| Reference 3 | 2.0 | 0.2 | " | 0.5 | | | 0.09 | 0.14 |
| 4 | 2.0 | 0.2 | Diethyl malonate | 0.5 | Aluminum bromide | 0.2 | 0.09 | 0.13 |
| Reference 4 | 2.0 | 0.2 | " | 0.5 | | | 0.08 | 0.04 |
| 5 | 2.0 | 0.2 | Acetone | 0.5 | $AlCl_3 \cdot O(C_2H_5)_3$ | 0.2 | 0.18 | 0.40 |
| Reference 5 | 2.0 | 0.2 | " | 0.5 | | | 0.24 | 0.13 |
| 6 | 2.0 | 0.2 | Benzophenone | 0.5 | Iodine | 0.2 | 0.15 | 0.67 |

*Butadiene microstructure: Trans=67%; Cis=25%; 1.2=8%.

As can be seen in Table 19, the yield of the high molecular weight alternating copolymer of butadiene and propylene was increased by adding halogen or halogen compound to the three components catalyst system of organoaluminum compound, titanium tetrachloride and carbonyl compound.

Example 29

The usual, dry, air-free technique was employed and 6.0 milliliters toluene, 0.5 millimole isobutyl aldehyde, 0.2 milliliter titanium tetrachloride solution in toluene (1 molar solution) and 0.2 millimole boron trifluoride diethyl ester complex were put successively in a 25 milliliters glass bottle at 25° C. Then the bottle was left alone at 100° C. for 10 minutes. Thereafter the bottle was held in a low temperature bath at −78° C. and 2.0

TABLE 20

| Experiment No. | Catalysts: Organoaluminum compound | Mmol | $TiCl_4$ (mmol) | Halogen or halogen compound | Mmol. | Diluent toluene (ml.) | Alternating copolymer: MEK soluble fraction (g.) | MEK insoluble, diethyl ether soluble fraction (g.) |
|---|---|---|---|---|---|---|---|---|
| 1 | $Al(i\text{-}Bu)_3$ | 2.5 | 1.0 | | | 5 | 0 | 0.09 |
| 2 | $Al(i\text{-}Bu)_3$ | 2.5 | 1.0 | Chromium (VI) oxychloride | 1.2 | 5 | 0.40 | 1.00 |
| 3 | $Al(i\text{-}Bu)_3$ | 2.5 | 1.0 | Vanadium (V) oxychloride | 1.0 | 4 | 0.89 | 0.58 |
| 4 | $Al(i\text{-}Bu)_3$ | 2.5 | 1.0 | tert-Butyl chloride | 2.5 | 5 | 0.10 | 0.14 |
| 5 | $Al(i\text{-}Bu)_3$ | 2.5 | 1.0 | Bromine | 0.8 | 5 | 0.08 | 0.34 |
| Reference 1 | $Al(i\text{-}Bu)_3$ | 1.5 | 1.0 | | | 5 | 0 | 0 |
| Reference 2 | $AlEt_3$ | 2.5 | 1.0 | | | 5 | 0 | 0 |
| Reference 3 | $AlEt_3$ | 1.5 | 1.0 | | | 5 | 0 | 0 |

milliliters triisobutylaluminum solution in toluene (1 molar solution) and a mixture of 2 milliliters liquid butadiene and 2 milliliters toluene were put successively into the bottle also employing the conventional, dry, air-free technique. Thereafter the bottle was sealed and allowed to copolymerize at −30° C. for 16 hours. The yield of methyl ethyl ketone soluble alternating copolymer of butadiene and propylene was 0.18 g. and that of methyl ethyl ketone insoluble and diethyl ether soluble fraction, i.e. alternating copolymer of butadiene and propylene was 0.74 g. When the three components catalyst system consisting of triisobutylaluminum, titanium tetrachloride and isobutylaldehyde was used and the other copolymerization conditions were the same as those in this example, the yield of the high molecular weight alternating copolymer was 0.47 g.

Example 30

The usual, dry, air-free technique was employed and varying amounts of toluene, 1.0 milliliter titanium tetrachloride solution in toluene (1 molar solution) and varying amounts of halogen or halogen compound were put successively in a 25 milliliters glass bottle at 25° C. Then the bottle was left alone at 25° C. for 10 minutes. Thereafter the bottle was held in a low temperature bath at −78° C. and varying amounts of organoaluminum compound in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 20. As can be seen in Table 20, by adding halogen or halogen compound to the two components catalyst system consisting of organoaluminum compound and titanium tetrahalide, the yield of the alternating copolymer increased, Ref. 1 also shows that when the mol ratio of triisobutylaluminum to titanium tetrachloride is 1.5 (Al/Ti=1.5) no alternating copolymer can be obtained.

Example 31

The conventional, dry, air-free technique was employed and 5.0 milliliters toluene, 1.0 milliliter titanium tetrachloride solution in toluene (1 molar solution) and 1.2 millimoles chromium (VI) oxychloride were put successively in a 25 milliliter glass bottle at 25° C. Then the bottle was left alone at 25° C. for 10 minutes. Thereafter the bottle was held in a low temperature bath at −78° C. and 2.5 milliliters triisobutylaluminum solution in toluene (1 molar solution), 3 milliliters styrene and 2 milliliters liquid butadiene were put successively into the bottle also employing the usual, dry, air-free technique. Thereafter the bottle was sealed and allowed to copolymerize at −30° C. for 16 hours. The yield of alternating copolymer of butadiene and styrene was 0.53 g.

Example 32

The usual, dry, air-free technique was employed and 0.5 millimole halogen compound, 6.5 milliliters toluene and 0.2 milliliter titanium tetrachloride solution in toluene (1 molar solution) were put successively in a 25 milliliter glass bottle at 25° C. Then the bottle was left alone at 25° C. for 10 minutes. Thereafter the bottle was held in a low temperature bath at −78° C. and 2.0 milliiters triisobutylaluminum solution in toluene (1 molar solution) and a mixture of 2 milliliters liquid propylene, milliliters liquid butadiene and 2 milliliters liquid toluene were put successively into the bottle also employing the usual, dry, air-free technique. Thereafter the bottle was sealed and allowed to copolymerize at −30° C. for 16 hours. The results are summarized in Table 21.

TABLE 21

| Experiment No. | Catalysts Al(i-Bu)$_3$ (mmol) | TiCl$_4$ (mmol) | Halogen compound* | Mmol | Alternating copolymer MEK soluble fraction (g.) | MEK insoluble diethyl ether soluble fraction (g.) |
|---|---|---|---|---|---|---|
| 1 | 2.0 | 0.2 | $BF_3.OEt_2$ | 0.5 | 0.12 | 0.28 |
| 2 | 2.0 | 0.2 | $AlCl_3.OEt_2$ | 0.5 | 0.07 | 0.12 |
| 3 | 2.0 | 0.2 | $ZnCl_2.Py$ | 0.5 | 0.10 | 0.08 |
| 4 | 2.0 | 0.2 | $VOCl_3.OEt_2$ | 0.5 | 0.50 | 0.60 |
| 5 | 2.0 | 0.2 | $NiI_2.Py$ | 0.5 | 0.05 | 0.15 |
| 6 | 2.0 | 0.2 | $FeCl_3.OEt_2$ | 0.5 | 0.11 | 0.21 |
| 7 | 2.0 | 0.1 | $HgCl_2.Py$ | 0.5 | 0.05 | 0.11 |
| 8 | 2.0 | 0.1 | $Cu_2Cl_2.Py$ | 0.5 | 0.04 | 0.12 |
| Reference | 2.0 | 0.1 | | | 0 | 0.03 |

*Et=Ethyl; Py=Pyridine.

Example 33

The usual, dry, air-free technique was employed and 0.5 millimole halogen compound, 6.5 milliliters toluene and 0.2 milliliter titanium tetrachloride solution in toluene (1 molar solution) were put successively in a 25 milliliter glass bottle at 25° C. Then the bottle was left alone at 25° C. for 10 minutes. Thereafter the bottle was held in a low temperature bath at −78° C. and 2.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 39 hours. The results are summarized in Table 22.

TABLE 22

| Experiment No. | Catalysts | | | | Alternating copolymer | |
|---|---|---|---|---|---|---|
| | $Al(i\text{-}Bu)_3$ (mmol) | $TiCl_4$ (mmol) | Halogen compound* | Mmol | MEK soluble fraction | MEK insoluble diethyl ether soluble fraction (g.) |
| 1 | 2 | 0.2 | $BiCl_3.CEt_2$ | 0.5 | 0.16 | 0.52 |
| 2 | 2 | 0.2 | $SnCl_4.OEt_2$ | 0.5 | 0.02 | 0.15 |
| 3 | 2 | 0.2 | $BCl_3.OEt_2$ | 0.5 | 0.02 | 0.10 |
| Reference | 2 | 0.2 | | | 0 | 0.05 |

*Et=Ethyl.

Example 34

The usual, dry air-free technique was employed and 0.5 millimole bismuth (III) chloride diethyl ether complex, 6.5 milliliters toluene and 0.2 milliliter titanium tetrachloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.0 milliliters triethylaluminum solution in toluene and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.05 g. and methyl ethyl ketone insoluble and diethyl ether soluble alternating copolymer of butadiene and propylene was 0.11 g. By using two components catalyst system of triethylaluminum and titanium tetrachloride, no alternating copolymer of butadiene and propylene was obtained.

What we claim is:

1. A process for preparing a 1:1 copolymer of butadiene and an alpha-olefin having alternating butadiene and alpha-olefin units, said alpha-olefin having the general formula of $CH_2{=}CHR'$ wherein R' represents a phenyl radical or a $C_1$ to $C_4$ normal or branched chain alkyl radical, which comprises contacting butadiene and the alpha-olefin in liquid phase at a temperature of from −100° C. to 50° C. with a catalyst system comprising a first component of an organoaluminum compound having the general formula of $AlR_3$ wherein R represents a hydrocarbon radical selected from the group consisting of an alkyl radical, an aryl radical and a cycloalkyl radical, a second component of titanium tetrahalide having the general formula $TiX'_4$ wherein X' is selected from the group consisting of chlorine, bromine and iodine, and a third component of a carbonyl group-containing compound, wherein the molar ratio of said organoaluminum compound to said titanium tetrahalide is from greater than 1.5 to 20 and the molar ratio of butadiene to said alpha-olefin in the initial monomer composition is within a range of from 20:80 to 80:20.

2. A process as claimed in claim 1, wherein the catalyst system contains a material selected from the group consisting of a metal oxide, a metalloid oxide, a halogen and a halogen compound as a fourth component.

3. A process as claimed in claim 1, wherein the molar ratio of the organoaluminum compound to the titanium tetrahalide is approximately 1.5–10.

4. A process as claimed in claim 1, wherein said halogen compound is selected from the group consisting of a halogen compound having Lewis acid property, a Lewis acid-base complex of a halogen compound having Lewis acid property, an organoaluminum compound having an Al-X linkage, an organotransition-metal compound having a transition metal-X linkage and an alkane compound having a C-X linkage, wherein X represents halogen.

5. A process as claimed in claim 1 wherein the polymerization reaction is carried out in the presence of a hydrocarbon diluent.

6. A process as claimed in claim 1 wherein the molar ratio of butadiene to the alpha-olefin in the initial monomer composition is substantially 50:50.

7. A process as claimed in claim 1, wherein said α-olefin is styrene.

8. A process as claimed in claim 1, wherein said α-olefin is selected from the group consisting of propylene, butene-1, pentene-1 and hexene-1.

9. A process as claimed in claim 1, werein said α-olefin is 4-methyl pentene-1.

* * * * *

UNITED STATES PATENT AND TRADEMARK OFFICE

CERTIFICATE OF CORRECTION

PATENT NO. : Re.28,850

DATED : June 8, 1976

INVENTOR(S) : AKIHIRO KAWASAKI et al

It is certified that error appears in the above-identified patent and that said Letters Patent are hereby corrected as shown below:

Column 1, line 32: replace "properites" with --- properties ---.

Column 1, line 54: after "titanium", delete the comma (,).

Column 1, line 56: after "zirconium", delete the comma (,).

Columns 7-8, Table 1: in the heading of the seventh column, delete "unit (percent)"; under "Microstructure of butadiene", insert --- unit (percent) ---.

Columns 9-10, Table 4: in the heading of the ninth column, replace "Cls-" with --- Cis- ---.

Columns 11-12, Table 7: in Experiment 1, fourth column, replace "Terephthaldehyde" with --- Terephthalaldehyde ---.

Columns 13-14, Table 8: in Experiment 1, sixth column, replace "0.97" with --- 0.07 ---.

Columns 15-16, Table 12: in Experiment 2, fourth column, replace "$Ti(Oi\text{-}Pr)_2(O\overset{O}{\overset{\|}{C}}CH_3)_3$" with

UNITED STATES PATENT AND TRADEMARK OFFICE

CERTIFICATE OF CORRECTION

PATENT NO. : Re.28,850

DATED : June 8, 1976

INVENTOR(S) : AKIHIRO KAWASAKI et al

It is certified that error appears in the above-identified patent and that said Letters Patent are hereby corrected as shown below:

--- $Ti(Oi\text{-}Pr_2(O\overset{O}{\overset{\|}{C}}CH_3)_2$ ---;

in Experiment 3, fourth column, replace "$O[Ti(O\overset{O}{\overset{\|}{C}}CH_3)_3]_3$" with --- $O[Ti(O\overset{O}{\overset{\|}{C}}CH_3)_3]_2$ ---.

Columns 23-24, Table 19: in Experiment 3, seventh column, replace "0.10" with --- 0.19 ---;

in Experiment 5, replace "$AlCl_3 \cdot O(C_2H_5)_3$" with --- $AlCl_3 \cdot O(C_2H_5)_2$ ---.

Column 24, line 65: replace "ester" with --- ether ---.

Column 25, line 60: replace "increased, Ref. 1" with --- increased. Ref. 1 ---.

Column 26, line 24: before "milliliters" (first occurrence) insert --- 2 ---.

UNITED STATES PATENT AND TRADEMARK OFFICE

CERTIFICATE OF CORRECTION

PATENT NO. : Re.28,850

DATED : June 8, 1976

INVENTOR(S) : AKIHIRO KAWASAKI et al

It is certified that error appears in the above-identified patent and that said Letters Patent are hereby corrected as shown below:

Column 4, line 25: after "2", close the parentheses (")").

Column 5, lines 16-17: at line 16, delete "(" before "1.5"; at line 17, insert --- ( --- before "Al/Ti".

Column 18, line 29: replace "or" with --- of ---.

Column 21, line 33: rewrite "mole" as --- molar ---.

Column 25, line 61: rewrite "mol ratio" as --- molar ratio ---.

Column 27, Table 22: at Experiment 1, fourth column, replace "$BiCl_3 \cdot CEt_2$" with --- $BiCl_3 \cdot OEt_2$ ---.

Signed and Sealed this

*twenty-third* Day of *August 1977*

[SEAL]

*Attest:*

RUTH C. MASON
*Attesting Officer*

C. MARSHALL DANN
*Commissioner of Patents and Trademarks*